United States Patent [19]

Samad

[11] Patent Number: 5,050,095

[45] Date of Patent: Sep. 17, 1991

[54] NEURAL NETWORK AUTO-ASSOCIATIVE MEMORY WITH TWO RULES FOR VARYING THE WEIGHTS

[75] Inventor: Tariq Samad, Minneapolis, Minn.

[73] Assignee: Honeywell Inc., Minneapolis, Minn.

[21] Appl. No.: 463,917

[22] Filed: Jan. 10, 1990

Related U.S. Application Data

[63] Continuation-in-part of Ser. No. 200,384, May 31, 1988, abandoned.

[51] Int. Cl.$^5$ .............................................. G06F 15/18
[52] U.S. Cl. .................................................. 364/513
[58] Field of Search .......................... 307/201; 364/513

[56] References Cited

U.S. PATENT DOCUMENTS

| | | |
|---|---|---|
| 3,519,998 | 7/1970 | Barron . |
| 3,579,191 | 5/1971 | Andrease et al. . |
| 3,593,307 | 7/1971 | Gauge, Jr. et al. . |
| 3,950,733 | 4/1976 | Cooper et al. ...................... 364/900 |
| 4,326,259 | 4/1982 | Cooper et al. ................. 364/715.11 |
| 4,660,166 | 4/1987 | Hopfield .............................. 364/807 |

OTHER PUBLICATIONS

"An Introduction to Computing with Neural Nets", Apr. 1987, IEEE ASSP Magazine.
"Computing with Neural Networks", May 1987, High Technology.

*Primary Examiner*—Allen R. MacDonald
*Attorney, Agent, or Firm*—Michael B. Atlass

[57] ABSTRACT

A neural network associative memory which has a single layer of primatives and which utilizes a variant of the generalized delta for calculating the connection weights between the primatives. The delta rule is characterized by its utilization of predetermined values for the primative and an error index which compares, during iterations, the predetermined primative values with actual primative values until the delta factor becomes a predetermined minimum value.

11 Claims, 7 Drawing Sheets

NEURAL NETWORK AUTO-ASSOCIATIVE MEMORY WITH TWO RULES FOR VARYING THE WEIGHTS

This application is a continuation-in-part of application Ser. No. 200,384, filed May 31, 1988 now abandoned.

The invention relates to new and improved methods for the storage and recall of memories in a neural network auto-associative memory.

References are referred to herein which are listed at the end of the descriptive portion hereof.

A particular promising application of neural networks which is within sight of widespread realization is the associative memory.

A main object of the invention is to provide new and improved methods for the storage and recall of memories of a neural network associative memory.

Other objects of the invention will become apparent from the following description of the invention, the associated drawing and the appended claims.

ARCHITECTURE

Figure 1:
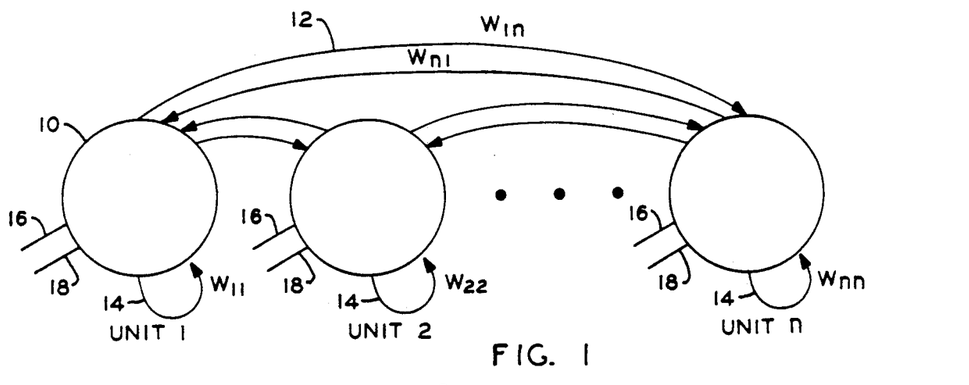
FIG. 1 is a schematic showing of a neural network auto-associative memory having n processing units.

Referring to FIG. 1, the primitives from which the associative memory is constructed are units 10, connections 12 and connections 14 of units back to themselves. The units also have individual inputs and outputs 16 and 18 which facilitate parallel processing. Each of the connections 12 and 14 has a real-valued weight associated with it. The connections are one-directional and the weight is the factor by which the output of the unit at the source of the connection influences the output of the unit at the destination of the connection. The output of a unit is a sigmoid function of the weighted sum of all its inputs:

$$o_j = 1 / \left(1 + \exp\left[-\sum_i o_i w_{ij} + \theta_j\right]\right) \quad (1)$$

where $w_{ij}$ is the weight on the connection from unit i to unit j, $o_j$ is the output of unit j, and $\theta_j$ is the "threshhold" for unit j. The term $$\sum_i o_i w_{ij} + \theta_j$$

is referred to as the "net input" for unit j.

FIG. 1 shows the architecture of the associative memory. For an n bit memory, n units are needed. Although it is not essential it is assumed herein that each unit is connected to every unit, including itself. Thus the summation term in Eq. (1) will also include $o_j$ itself with j being one of the i values. In order to determine the values of the units we simulate the continuous processing of the network by an iterative process that updates the units at discrete time slices. At each iteration, new $o_j$ are derived. Only when the change in the $o_j$ from one iteration to the next is small can we assume that the $o_j$ are the correct values. This iterative process of finding the "stable" values for the units is called "relaxation" and is common in neural networks that have feedback connections.

The presence of self-weights is theoretically significant because it allows the network to store sets of patterns that do not conform to the "linear predictability constraint" [McCL86] where the value of a given unit cannot be determined as a linear combination of the other units' values. An example of such a set of patterns is: [(0 1 0), (1 1 1), (1 0 0), (0 0 1)]. In these patterns, the second bit-position is not independent because its value is the "equivalence" function applied to the first and third bits. The storage procedure defined below is able to store these four patterns in a three unit network. This capability can be traced specifically to the self-weights. With all $w_{ij}$ set equal to zero permanently, these patterns could not be learned. A more general example of patterns that are not linearly predictable are those in which one bit-position encodes the "parity" of the others. Both Hopfield memories, and the recent associative memory model of McClelland and Rumelhart [McCL86] are theoretically incapable of storing (or recalling) such patterns.

STORAGE

The storage of patterns in the memory is effected by assigning appropriate values to the weights. A pattern is considered "stored" by the network when the network, after presentation of that pattern and subsequent relaxation, remains in the state representing the pattern. Thus the patterns or memories may be considered stable points in the n-dimensional state space through which the network "travels". Associative memory behavior results from the fact that these stable points are virtually the only stable points in the space local to the stored patterns, so that when the network is presented with a cue that is nearby the space of a stored pattern, it moves to the stable point.

The learning rule that we use produces a set of connection weights that "define" stable points or memories. The set of patterns or memories that the network learns is called the "training set". During the learning phase the network iterates through the training set, checking its output o, the state of the network after relaxation, against the desired output p for each training set element. Whenever the actual output differs from the desired output, the weights that contribute to that output are modified. The learning rule that specifies the change in the weight from unit i to unit j, as well as the changes in the feedback and threshold weights, is given below:

$$\Delta w_{ij} = \eta p_i \delta_j \quad (2)$$

$$\Delta w_{jj} = \eta p_j \delta_j \quad (2a)$$

$$\Delta \theta_j = \eta \delta_j \quad (2b)$$

where $\eta$ is a constant that determines the learning rate (a value of 0.3 was used in the experiments described later), $p_i$ is the value for unit i in the pattern being learned, $p_j$ is the value for unit j in the pattern being learned, $\theta_j$ is the threshold weight for unit j, and $\delta j$ is the "error signal" for unit j. The error signal is given below:

$$\delta_j = (p_j - o_j) o'_j \qquad (3)$$

Thus $\delta_j$ is simply the product of the difference in what the unit produced and what it should have produced, and the derivative of $o_j$ with respect to its net input. For the sigmoid function of Eq. 1, $o'_j = o_j(1 - o_j)$.

The threshholds are thought of as weights from unit-valued source units and are also changed by the same algorithm. Initially, all weights and threshholds are set to small randomly generated values.

This learning method looks very much like the "back-propagation" method as described in [RUME85] and, in fact, this is the starting point for the development of the method. There are some important differences, however, in both the use of the rule and the kinds of networks that are employed.

Back-propagation is virtually always used in multi-layered networks without feedback connections. The effect of the back-propagation rule is to modify the weights for connections to and between "hidden" layers, the layers between the input and output layers, whose unit values are not given in the input-output mappings that are learned. Our associative memory has a very different architecture from these multi-layered models, there being only a single layer of units, and it does have feedback connections.

One consequence of the distinct input and output layers of the back-propagation model is that the network can learn arbitrary input-output mappings. That is, the "training set" provided to the network consists of input-output pairs, and the relationship between each corresponding input and output pattern can be arbitrary. In our case, the training set consists of single patterns and, in essence, our network is only required to learn the identity mapping.

It is important to note the difference in the processing of the two different models. The layered model effects a sequence of transformations of the input vector through each hidden layer to the output layer where the output vector is determined. Thus the input vector is transformed n−1 times in sequence where n is the total number of layers in the network. There are a discrete number of steps in the calculation. This is very different from the processing done by our associative memory where the relaxation process is stopped only when the change from one state to the next is less than some threshhold. The actual number of iterations or "transformations" is not a known, discrete value as is the case in the layered networks although from our simulations we have found that the network generally converges to some stable point in 5 to 15 iterations.

The differences in the processing of the networks are reflected in the learning rules. When the connection strength is adjusted between a source unit and a destination unit in a layered network, the value of the source unit is the value which was calculated for that unit or, if the unit lies in the input layer, an input value. This gives us the generalized delta rule:

$$\Delta w_{ij} = \eta o_i \delta_j \qquad (4)$$

where $o_i$ is the value of the source unit. The expression for $\delta_j$ given by Eq. (3) can only be used if j is an output unit. The importance of the back-propagation learning procedure lies in the discovery of an expression for hidden-unit error-signals in terms of output-unit error-signals. See [RUME85] for details.

The difference between Eq. (4) and the learning rule for our associative memory Eq. (2), is in the value of the source unit. In the associative memory this value is the initial value that the network was given for the unit, not the value that was "calculated" by the network. Further, this is the desired value for the unit. The need to use this value rather than the calculated value becomes apparent if our definition of a stored value is considered. In order to make the memory a stable state of the network, the learning rule must minimize the error in the destination unit, based on the initial value of the source unit—a memory value. Note that the error in the source unit is independently and simultaneously being minimized by other weight changes.

In general then, with each iteration through the training set, the error between the desired memories and the unit values after relaxation is reduced until the memories become stable points. At this point the learning, or storage, terminates.

RECALL

A recall cue is given to the memory by applying the values of some pattern to the inputs 16 of the processing units 10. A relaxation phase is undertaken once again, and the resulting unit-values constitute the response of the network to the cue. As a unit-value is never exactly one or zero for any finite input, we interpreted a value above 0.5 as one and below 0.5 as zero. We distinguish between three types of responses:

1. The response is the memory closest to the cue. "Closeness" is measured in terms of Hamming distance.
2. The response is a memory that is not closest to the cue.
3. The response is not a memory at all. Such a response is called a "false positive", and it implies that the network has stored some spurious patterns as a side-effect of storing the given patterns.

A good measure of the performance of an associative memory is how frequently its response is of Type 1. Occasional retrievals of the second type are acceptable if the retrieved value is close to the best, and if the Hamming distance between the best stored value and the recall cue is relatively large. Responses of the third type imply a breakdown of the associative memory.

There are some properties of the storage procedure that facilitate the associative behavior of our memory. First, the termination criterion of the storage procedure guarantees that if the recall cue is a memory, the retrieved value will be identical to the cue. In some neural network associative memory models, notably the Hopfield model [HOPF82], the memory states are not guaranteed to be stable. Second, it may be noted that unit values after the relaxation step will often not be the desired memories, but false positives. The application of the learning procedure at this point effectively removes these false positives by making them unstable states of the network. Third, it has been experimentally verified that as storage progresses, relaxed values tend to occur increasingly closer to the desired memories. Thus not only are nearby false positives made unstable, but the new stable states get increasingly closer to the corresponding memories.

As may be expected, recall thus works best if the recall cue is relatively close to a stored memory. For distant cues, false positives are more frequent. In the next section, a technique is described that reduces the frequency of false positive results.

"Simulated Annealing" with real-valued units

During the storage process, the stability of the memories is explicitly being reinforced at every iteration. On the other hand, false positives arise spontaneously and are not reinforced. Therefore, we can expect that false positives will only be "locally" stable. That is, the probability that a network with activation slightly different from a false positive will relax to the false positive is significantly smaller than the probability that a network with activation slightly different from a memory will relax to that memory. In a sense, false positives correspond to local minima, whereas memories correspond to global minima in the neighborhood of a memory in the state space.

Simulated annealing [KIRK83] has been used in neural networks as a method of helping the network reach a global minimum for an "energy" function that can be defined over the network [HOPF82, ACKL85]. The expression for the energy function relies on a network architecture with symmetric weights (i.e., $w_{ij}=w_{ji}$), no self-weights (i.e., $w_{ii}=0$), and binary valued units. These constraints are not satisfied by our network. We have not been able as yet to discover an appropriate "energy" function for the network architecture of our associative memory. Intuitively, however, it is clear that the relaxation procedure described below is analogous to annealing.

Instead of using the "temperature" of the annealing schedule to define the probability distribution of a variable having a specific value, we use the temperature to define an envelope from within which the value of the unit is randomly selected. Initially (high temperature) the area within the envelope is large, and the non-determinism in the value of the unit is also large. If T is the "temperature", then $$1/(1+exp[-net_j+T]) \leq o_j \leq 1/(1+exp[-net_j-T]) \quad (5)$$

where $net_j = \sum_i w_{ij} o_j + \theta_j$.

Figure 2:
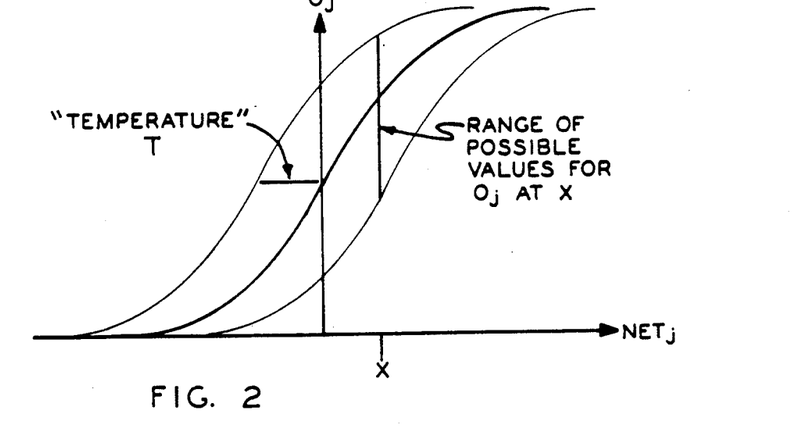
FIG. 2 is a characteristic curve of a sigmoid type processing unit provided with an envelope.

The size of the envelope is gradually shrunk (i.e., T is decreased) according to the annealing schedule, until finally the width of the envelope is zero (i.e., T=0) and Eq. (5) reverts to Eq. (1) as indicated in FIG. 2.

We only use this simulated-annealing inspired relaxation procedure during recall, not during the storage process. The detection of false positives during storage is desirable, so that the weights can be adjusted to remove them.

Given a recall cue, we are not interested in finding the global minimum for the network. The global minimum would not depend on the recall cue at all, as it is simply a function of the weights. Instead, we would like to find the "deepest" minimum within a small radius of the recall cue. Thus the annealing schedule does not start off with a very high temperature. The optimal schedule seems to be a function of the number of patterns that are stored and it probably also depends on the Hamming distances between the stored patterns.

MEMORY CAPACITY

Figure 3:
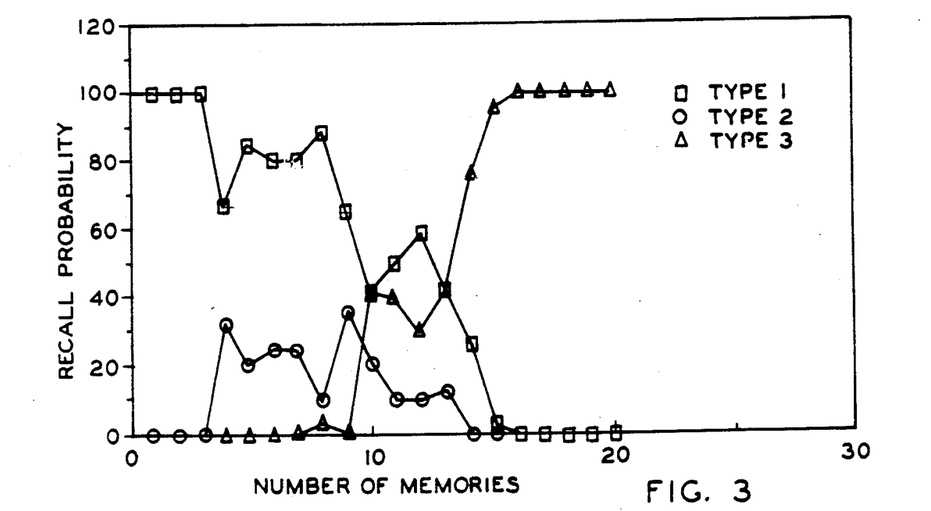
FIGS. 3 to 8 are graphs of recall probabilities relative to the number of memories stored in a neural network and the hamming distances of the recall cues.

An interesting and distinctive feature of our associative meory is that there does not appear to be any limitation on the number of memories that can be stored. For small n, we have been able to store $2^n$ patterns. In general, however, the fewer the patterns stored, the better the performance. FIG. 3 shows the results of one experiment in which the frequencies of recall of each "type" for various numbers of memories were recorded. In each case, the number of iterations through the memory set the network took for storage was in the low hundreds. A 5 unit network was used with the "annealing" relaxation procedure disabled. The recall cues were randomly generated and excluded memories because performance with memories as cues is always perfect, as noted above. More than 20 memories always led to the recall of false positives with any non-memory cue.

All subsequent experiments were conduced with a 50 unit network and 10 memories. The memories were randomly generated, but the same set was used for every experiment.

THE EFFECT OF "ANNEALING"

Figure 4A:
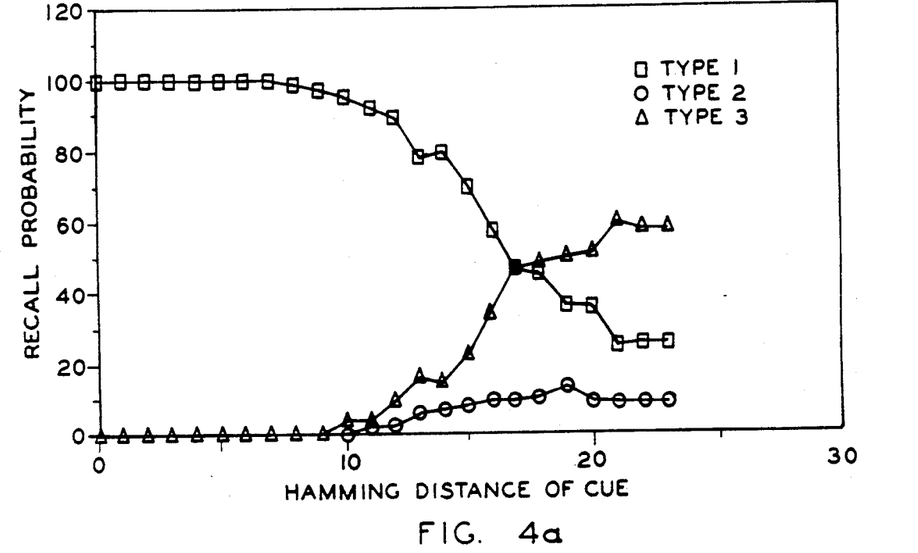

It is stated above that the frequency of false positives increases with the Hamming distance of the recall cue from the nearest memory. This is obvious from FIG. 4a, where the recall probabilities for cues of various Hamming distances is depicted. Storage in this case took 36 iterations. "Annealing" was not used. As can be seen, performance with relatively small Hamming distances is perfect but at larger distances false positives outnumber correct recalls. Recalls of Type 2 (non-closest memories) also increase with distance, but slowly. Even at a Hamming distance of 23, the largest distance that allowed a meaningful number of cues, recalls of Type 2 were at 14%. In all observed cases, Type 2 recalls were within 1 or 2 Hamming units from the closest memory.

Figure 4B:
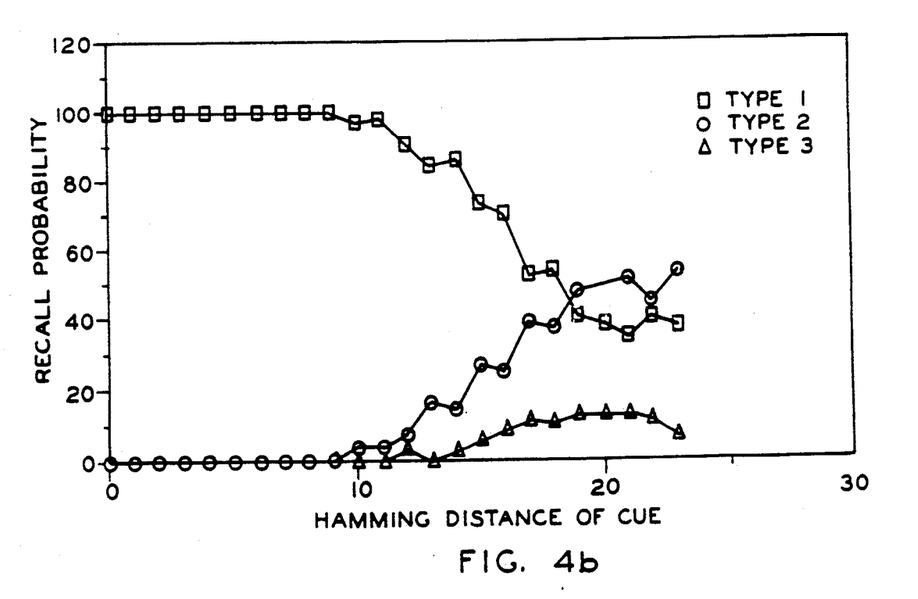

FIG. 4b depicts performance with "annealing" enabled for recall. The following annealing schedule was followed: 5 iterations at a "temperature" of 0.3, 8@0.2, 10@0.1, followed by the deterministic relaxation phase. Numerous other schedules gave comparable results. In particular, the number of false positives is greatly reduced. Type 2 recalls become more frequent. This is consistent with our understanding of the annealing process because a perturbation of a cue may cause a pattern of activity that is mapped onto a memory that is not the closest to the original cue. The percentage of perfect recalls also increases.

ROBUSTNESS

Figure 5:
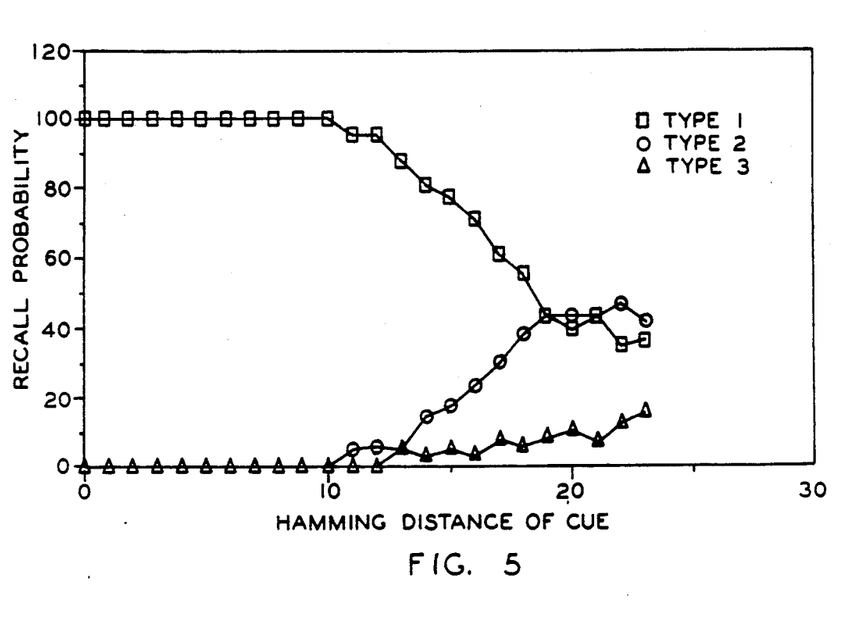
Figure 6:
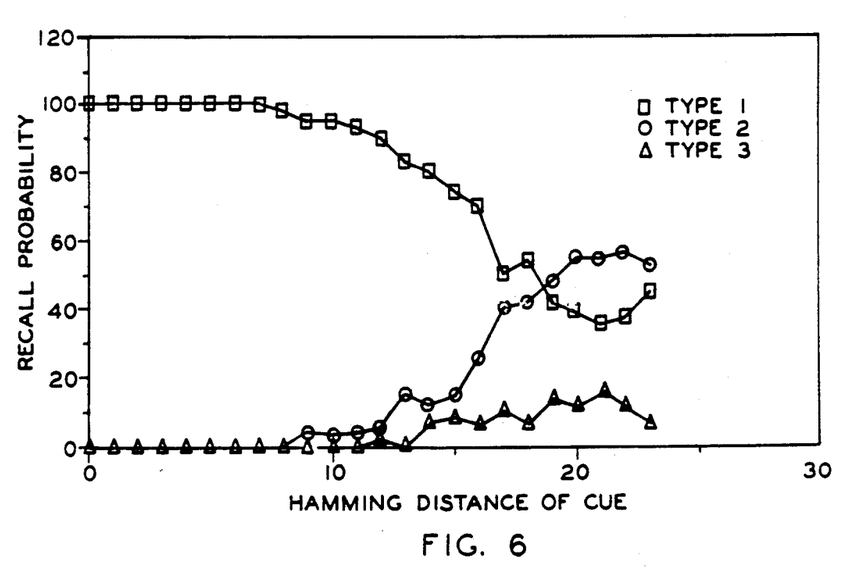

One characteristic feature of most neural network models is their robustness. FIGS. 5 and 6 demonstrate two aspects of the robustness of our associative memory. The network used for FIG. 5 had fifty percent of its weights and threshholds disabled before learning. As the figure shows, the effect on recall was minimal. This is particularly significant since the connectivity of our (fully-connected) model is higher than of some other models such as Hopfield memories, for example. The fully connected network that we have hitherto been considering has $n(n+1)$ distinct weights, whereas Hopfield nets have $\frac{1}{2}n(n-1)$. FIG. 5 shows that a significantly reduced connectivity does not adversely affect performance.

FIG. 6 shows the tolerance of the network to damage. After learning, the weights were perturbed randomly by ±20%. Again, the effect on the network was minimal.

THE EFFECT OF DISTANCE BETWEEN MEMORIES

Another topic of interest is the sensitivity of the network to the relative amount of shared information between memories. To determine the extent of this sensitivity, we ran a number of simulations in which the distance between memories was controlled. Memory sets were generated in a semi-random fashion so that all members of a set were within some range of distance, in terms of Hamming units (HU), of each other. Sets were generated with memories within the following ranges: 1-5 HU, 11-15, and 21-50 HU. An equal number of recall cues were generated for every Hamming distance between 0 and 20.

Figure 7A:
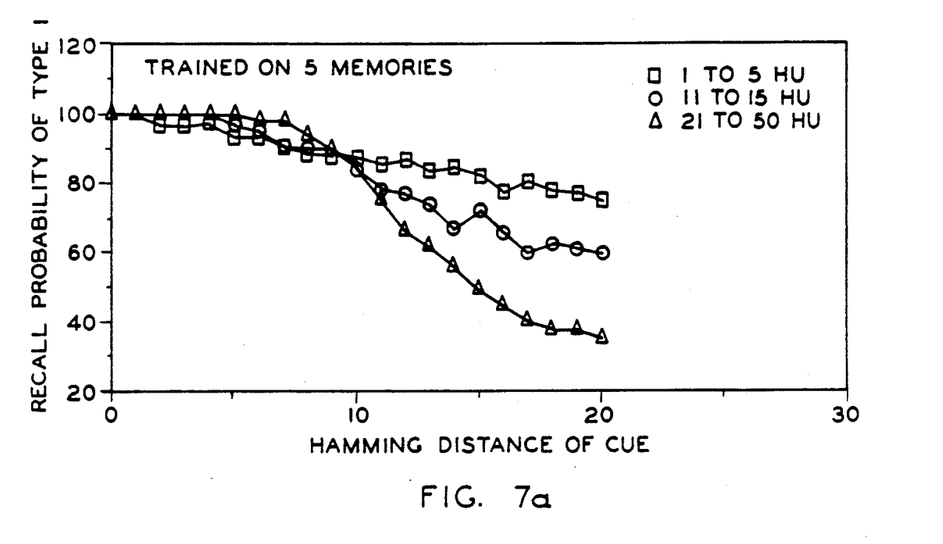
Figure 7B:
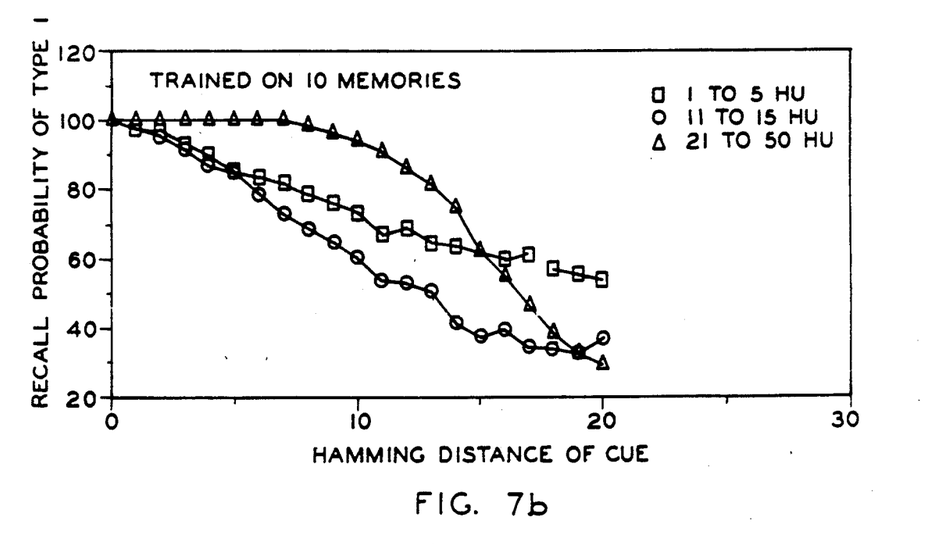

FIG. 7 shows the percentage of correct (Type 1) recalls of the model on each of these different sets. In fact, the memory performs better with cues that are relatively distant from the closest memory when it has been trained on a set of closely related memories than when the memories are further apart. We do not at this point have an adequate explanation for this phenomenon.

When the network is trained on memories that are closest together (1-5 HU) the closest memory is recalled over 95% of the time with cues that are 5 HU away. This suggests that efficacy of storage is not dependent on the amount of information shared by the memories as is the case with other associative memory models. The model is able to discriminate between memories that share over 90% of their bit information. This is the case because the storage algorithm creates stable points in the state space irrespective of nearby memories.

COMPARISON WITH THE HOPFIELD MODEL

In order to develop some metric of performance with regard to other work in this area, we compared the performance of our model with perhaps the best known neural network associative memory model, Hopfield memories [HOPF82].

Figure 8A:
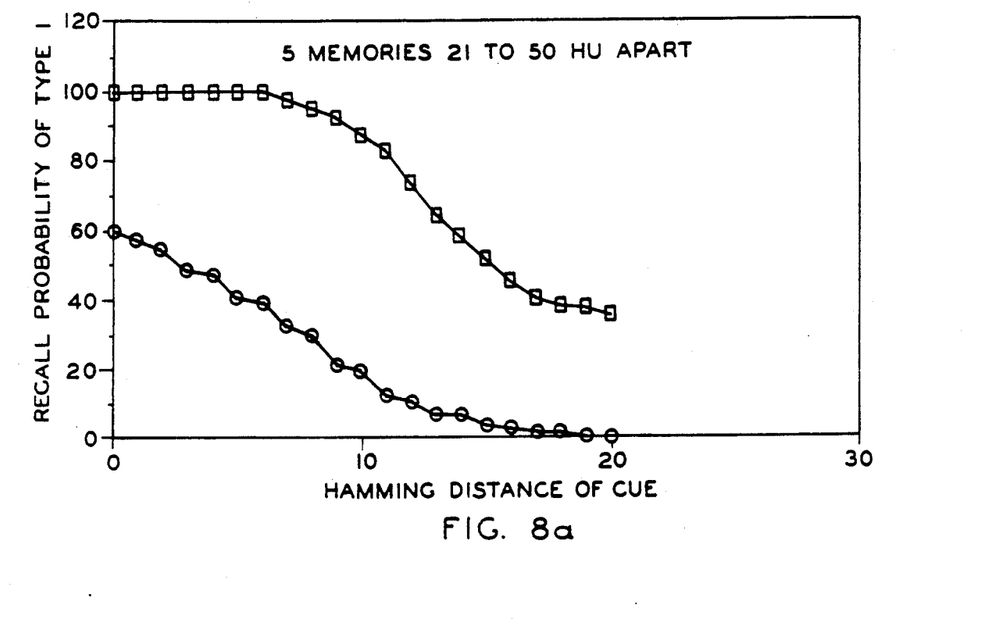
Figure 8B:
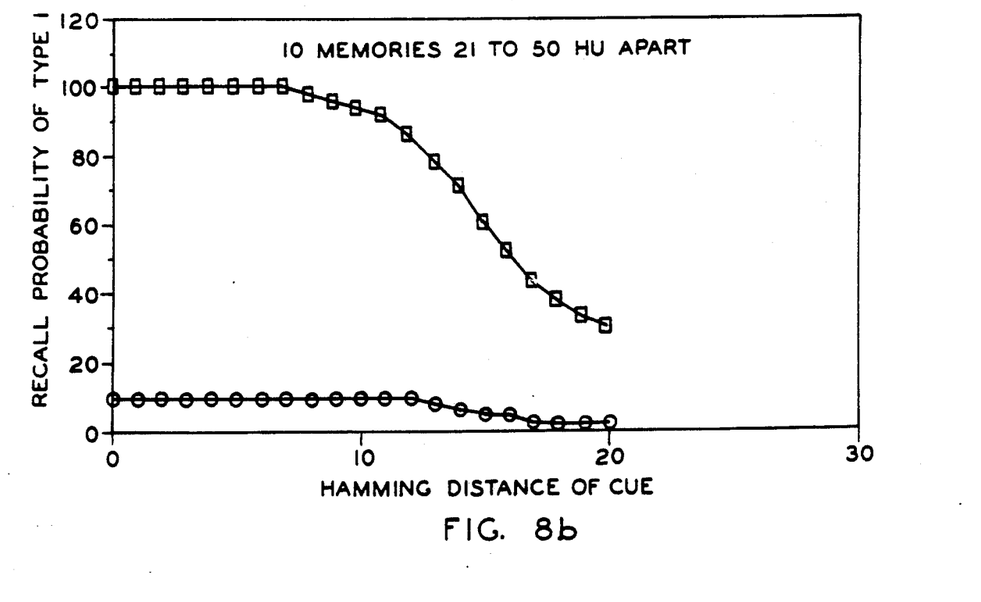

We ran simulations as above on 50 unit networks with sets of memories generated within controlled ranges of distance. Tests were run with sets of 5 (0.1 n) and 10 (0.2 n) memories. Some of the results are shown in FIGS. 8a and 8b. For memory sets at distances between 6 and 20 Hamming units, the Hopfield model failed to produce any memory recalls at both 0.1 n and 0.2 n. Strangely, at distances of 1 to 5 HU, the Hopfield model produced only results of Types 1 and 2, with performance improving as the cue moved further and further away from the closest memory. This is in contradiction to our understanding of association. As cues move further away recall should become more difficult and less accurate.

When run on memories that shared the least information the Hopfield model produced the best results. This result is clearly an artifact of the learning algorithm that is employed by the model. For performance to be at all reasonable, memories must share as little information as possible. Our associative memory model does not share this requirement, allowing storage of memories that are quite similar in terms of the degree of shared information.

IMPLEMENTATION

Figure 9:
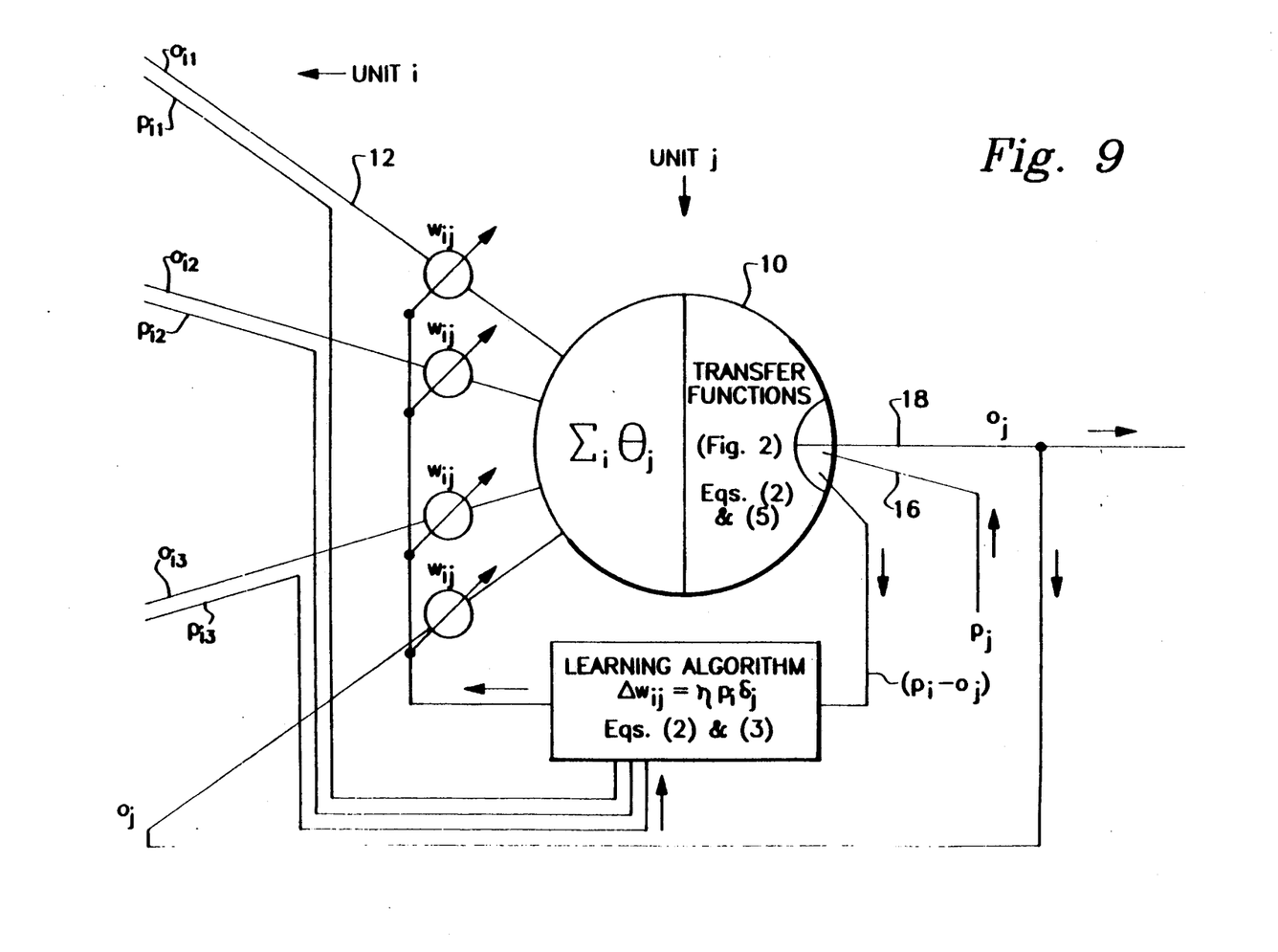
FIG. 9 shows a prior art processing element assembly of the general type which comprises the network shown in FIG. 1.

The neural network and features thereof described above and shown in FIGS. 1 and 2 may be implemented with a prior art type of processing element assembly as shown in FIG. 9. This is known as an Adaline type of processing element.

Figure 10:
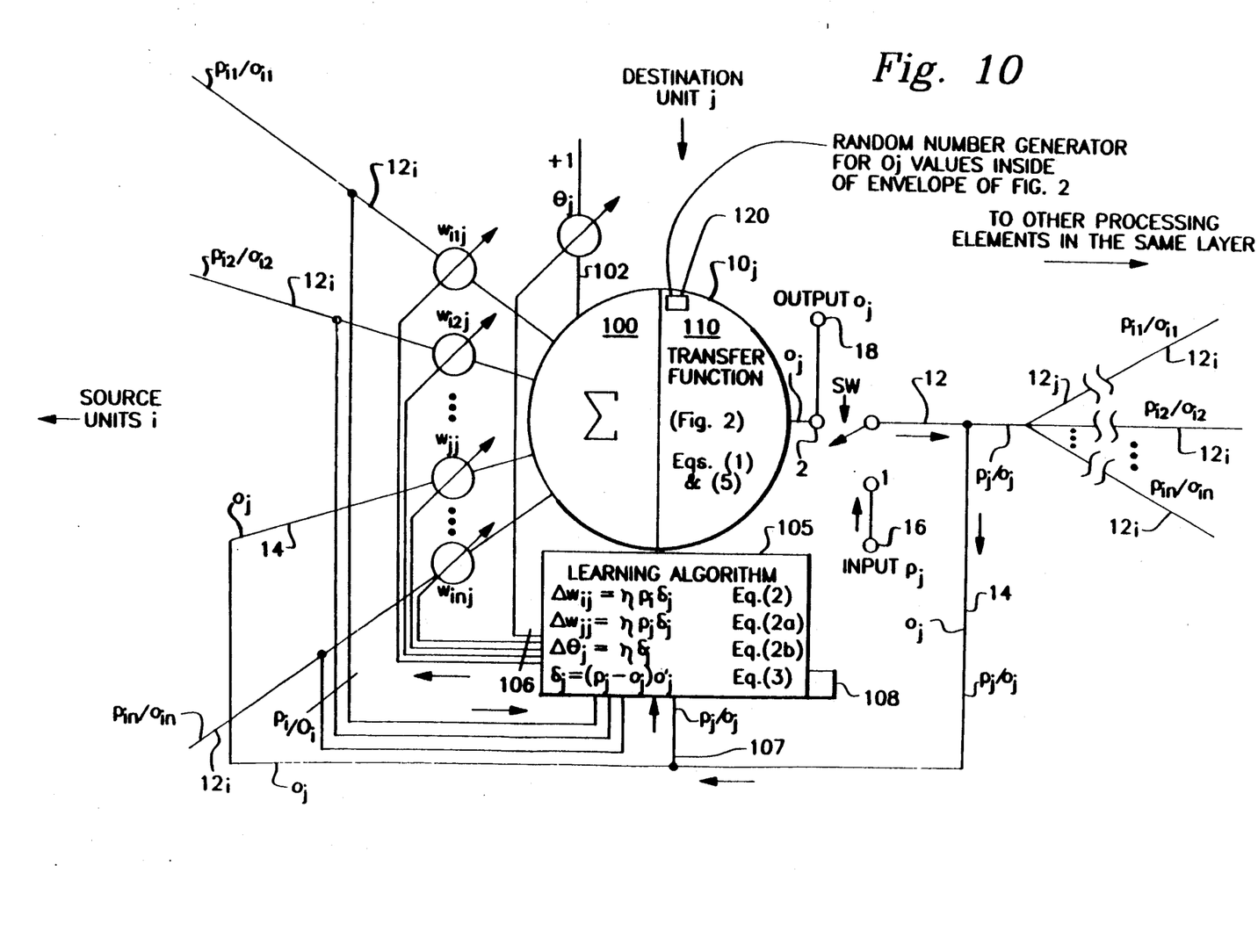
FIG. 10 shows the processing element assembly architecture, in accordance with the invention, of the processing element assemblies which comprise the network of FIG. 1.

An example of such an implementation in accordance with the present invention is shown in a processing element assembly in FIG. 10 which incorporates two of the novel features herein which are (i) applicants' learning algorithm based on equations (2), (2a), (2b) and (3) and (ii) the processing element transfer function of FIG. 2 based on equation (5). A third feature is the association of feature (i) of the learning algorithm with a single layer type architecture which includes a feedback function for each of the processing elements.

By "single layer architecture" it is meant that the processing elements are not arranged in a heirarchical fashion so that, for example, there are separate elements that receive input patterns and separate elements that produce the output of the memory. Unlike many prior art neural network architectures, there is no division of the processing elements into input, hidden and output units. An example of a well-known single layer neural network is the graded-response Hopfield network (U.S. Pat. No. 4,660,166). However, the Hopfield network is constrained to have bidirectional connections between processing elements i and j so that the weight from element i to element j, or $w_{ij}$, must be identical to the weight from element j to element i or $w_{ji}$. In the invention herein, connections can exist both from i to j and from j to i, but these are separate unidirectional connections and there is no constraint that the corresponding weight values be identical. An advantage of single-layer structures is that a lesser number of processing elements are required.

The processing element assembly of FIG. 10 is in substance derived entirely from the prior art and the disclosure of the originally filed parent application.

The processing element assembly of FIG. 10 is shown schematically and comprises a processing element 10j having an input 16, an output 18 and a feedback line 14. The processing element 10j has a summation section 100 for receiving and summing the outputs of source processing elements to which it is connected along with the feedback 14 of its own output. A convention threshold bias $\theta_j$ or $w_j$ is on a line 102 which extends to the summation section 100.

The processing element 10j has a transfer section 110 which in this embodiment is illustrated as having a sigmoid function as shown in FIG. 2. The broader concept of the invention is not limited to any particular transfer function for the processing element 10j, however.

Fan-in connection means include connection lines 12i which extend respectively from source processing elements (i) to the summation section 100 of processing element 10j. Fan-out connection means includes a connection line 12 which extends outwardly away from the output 18 of processing element 10j and which subsequently branches into fan-out lines 12i which extend to destination processing elements.

The part of feedback line 14 which extends away from the output 18 of processing element 10j is included in the fan-out connection means and the part thereof which extends to the summation section 100 of processing element 10j is included in the fan-in connection means.

Connection lines 12i (left side of FIG. 10), feedback line 14 and bias line 102 have conventional weights ($w_{i1j}$, $w_{i2j}$, ..., $w_{inj}$, $w_{jj}$ and $\theta_j$) associated therewith which are variable and are controlled in accordance with the learning algorithm expressed in equations (2), (2a), (2b) and (3). The learning algorithm is illustrated symbolically as being associated with a processor 105 to which all the weights are connected via control lines 106. The connection line having the variable weight $w_{jj}$ is the feedback line 14 referred to above.

Input 16, which is connected to memory associated with processor 105 via a switch sw, line 14, and line 107, is utilized for initialization prior to the learning and recall operations. Input 16 is used in connection therewith to apply $p_j$ of an input vector to a memory 108 illustrated symbolically as being associated with learning algorithm 105. The value of $p_j$ associated with the illustrated processing element 10j ($p_j$ in Equation (3)) is stored in memory 108 associated with the processing element 10j and respectively in corresponding memories associated with processing elements downstream from the processing elements 10j via lines 12 and 12j where the value of $p_j$ in Equation (3) becomes the value of $p_i$ in Equation (2) for destination processing elements to which the illustrated processing element 10j is connected.

Initialization for the learning and recall mode is facilitated by switch sw being in the "1" position. The value of $p_j$ of the input learning vector (or input cuing vector) is transferred to memories as indicated above, to the summation section 100 of processing element 10j and to the corresponding summation sections of destination processing elements to which the processing elements 10j is connected via line 12, 12j and 12i.

The learning mode is facilitated by switch sw being in the "2" position. During the learning mode the learning algorithm relative to each processing element is iteratively supplied with (1) values of outputs $o_j$ via lines 124 and 107 and (2) outputs $o_i$ of source processing elements supplied to the summation section 100 of processing elements 10j via lines 12i. Also, the output $o_j$ of each processing element is supplied as a feedback to its own summation section 100 via line 14. The value of $p_j$ of the input cuing vector is transferred to the summation section of processing element 10j via feedback line 14 and to the summation sections of destination or downstream processing elements via lines 12j and 12i.

The recall mode is facilitated by switch sw being in the "2" position but means (not shown) are provided to facilitate bypassing the learning algothim 105.

The learning algorithm operates only during the learning stage and has a cyclical operation. In outline, the learning algorithm is:

REPEAT
  FOR EACH pattern p to be stored
    Initialize network to pattern p
    Allow network to stabilize
    IF network output≠p (within some predetermined tolerance)
    THEN modify weights
  END (FOR EACH)
UNTIL all patterns are stored In the inner loop, a pattern p that is desired to be stored in the network memory is used to initialize the network. That is, the switch sw is placed in position "1" and the pattern p is asserted on input lines 16 of all processing elements 10. Then the switch is moved to position "2", thereby realizing a feedback architecture. The network is allowed to run with processing element updates itself based on equation (1), or, optionally, on a processing element design having a transfer function as described with respect to Equation (5).

At this point, the outputs $o_j$ are compared with corresponding pattern elements $p_j$. If they are within some tolerance level, then weights to processing elements j are not modified. Otherwise, weights $w_{ij}$, $w_{jj}$ and $\Theta_j$ are modified in accordance with Equations (2), (2a), (2b), and (3).

In the inner loop, the initialization-stabilization-weight-modification is done for each pattern to be stored. The inner loop is repeated as long as necessary for all patterns to be stored.

The recall operation is similar to the learning operation except that the weights are held in their adjusted states and means (not shown) are provided for isolating or bypassing the learning algorithm 105. For recall, the network is initialized with the recall cue which is typically a noisy or incomplete version of one of the stored patterns. Iterations during the stabilization phase result in changing the $o_j$ output values and continue until stability is reached wherein the $o_j$ values are nominally "zero" or "one" within some tolerance. If recall is successful the final values of the units $o_j$ will be identical to a stored pattern that is "closed" to the recall cue.

A random number generator 120 is shown associated with the sigmoid transfer function 110 of the processing element 10j.

With reference to FIG. 2, there is shown a sigmoid function inside an envelope. The output $o_j$ of a prior art processing element would be such a sigmoid function in accordance with Equation (1). In the invention disclosed herein the envelope shown in FIG. 2 is pursuant to Equation (5) and the size parameter T thereof is given an initial value to determine the initial size of the envelope. The parameter is iteratively shrunk or made smaller during recall in accordance with a desired schedule for the parameter T in Equation (5).

At any particular value of $net_j$, such as "x" for example, the random number generator 120 determines the corresponding $o_j$ value by the envelope at that point. The purpose and advantages of this transfer function are described above.

SUMMARY

We have described a new neural network auto-associative memory model. The connectivity of this model is greater than that of some other recent models. One particular aspect of its connectivity, the presence of self-weights, allows the network to store memories that are not "linearly predictable". An example is a set of memories in which one particular bit-position represents the "parity" of the remaining bits. Storage in our model is accomplished through a variation of the generalized delta rule which uses the memories as a "training set" to adjust weights and threshholds until the memories become stable points of the network. The generalized delta rule has been used previously in back-propagation networks. Our associative memory differs from most back-propagation networks in two ways wherein (1) we use a single layer network instead of a multi-layer one and (2) we allow feed-back connections. The presence of feedback implies that a "relaxation" phase is necessary. We have implemented a relaxation procedure that is analogous to stimulated annealing but that can be used with real-valued units instead of binary ones. This relaxation procedure greatly improves the performance of the memory and, in particular, results in much fewer false positive results. A number of experimental results were presented that detail the effect on performance of the number of memories, of damage to the network, and of the amount of shared information between memories.

It seems evident, theoretically and on the basis of our simulations, that the model described here has definite and significant advantages over some well-known associative memory models.

REFERENCES

ACKL85 Ackley, D. H., G. E. Hinton, and T. J. Sejnowksi, "A learning algorithm for Boltzmann machines", Cognitive Science, Vol. 9, pp. 147-169, 1985.

HINT81 Hinton, G. E., and Anderson, J. A., (Eds.) Parallel Models of Associative Memory, Lawrence Erlbaum Associates, 1981.

HOPF82 Hopfield, J. J., "Neural networks and physical systems with emergent collective computational abilities", Proceedings of the National Academy of Sciences, Vol. 79, pp. 2,554-2,558, April, 1982.

KIRK83 Kirkpatrick, S., C. D. Gelatt, and M. P. Vecchi, "Optimization by simulated annealing", Science, Vol. 220, pp. 671-680, 1983.

McCL86 McClelland, J. L., and D. E. Rumelhart, "A distributed model of human learning and memory", in Parallel Distributed Processing: Explorations in the Microstructure of Cognition, Vol. 1, McClelland J. L. and D. E. Rumelhart (Eds) pp. 170-215, 1986.

RUME85 Rumelhart, D. E., G. E. Hinton, and R. J. Williams, Learning Internal Representations by Error Propagation, ICS Report 8506, Institute for Cognitive Science, University of California, San Diego, September, 1985.

It is claimed:

1. A neural network associative memory, comprising,
    a single layer of processing elements having source and destination ones of said elements which are respectively referenced as (i) and (j) elements,
    each of said elements having available a summation means for summing weighted inputs to said elements and a transfer function means for computing transformation of said summed weighted inputs,
    an input means for and associated with individual ones of said elements for receiving patterns to be learned and patterns to be identified,
    an output means for and associated with individual ones of said elements for outputting patterns generated by said individual ones of said processing elements,
    a first set of unidirectional connections comprising a first set of variable value weights extending respectively from said a plurality of said output means of said elements to a plurality of said summation means of other individual ones of said elements,
    a second set of unidirectional connections forming a second set of variable value weights extending respectively from said output means of a plurality of said elements to said summation means of the same ones of said elements, and
    means for varying the values of said first set of weights pursuant to the rule $\Delta w_{ij} = \eta p_i \delta_j$ and the values of said second set of weights pursuant to the rule $\Delta w_{jj} = \eta p_j \delta_j$, wherein $(w_{ij})$ are variable connection weights between functionally adjacent ones (i) and (j) of said elements, $(\eta)$ is a constant that determines the learning rate, $(w_{jj})$ are variable feedback connection weights for each of said elements, $(p_i)$ are predetermined values of said patterns to be learned and identified associated with said (i) elements and $(\delta_j)$ are error signals respectively of said (j) elements.

2. A neural network associative memory in accordance with claim 1 wherein said first set of connections extend respectively from said output means of all of said elements to said summation means of all of said elements.

3. A neural network associative memory in accordance with claim 1 wherein said transfer function associated with at least some of said processing elements has a sigmoidal function.

4. A neural network associative memory, comprising:
    a plurality of processing elements each having summation means and for summing weighted inputs to said elements and sigmoid transfer function means for computing the transformation of said summed weighted inputs,
    input means for individual ones of said elements for receiving patterns to be learned and patterns to be identified,
    output means for individuals ones of said elements for outputting patterns generated by said processing elements,
    connection means for forming variable value weights connecting said output means of some of said elements and said summation means of other of said elements,
    each of said processing elements having envelope means for providing an envelope for said sigmoid transfer function means thereof and random value output means for providing random output values within the boundary of said envelope for corresponding values output of said summations means, and learning algorithm means activated iteratively and means for varying the values of said weights pursuant thereto at each iteration.

5. A neural network according to claim 4 wherein said prototype element includes means for varying the size of said envelope starting with a predetermined size and becoming smaller with subsequent iteration.

6. A neural network according to claim 4 or 5 wherein said envelope has the form $$1/(1 + exp[-net_j + T]) \leq o_j \leq 1/(1 + exp[-net_j - T])$$

where $net_j = \sum_i w_{ij} o_j - \theta_j, (w_{ij})$ are variable connection weights between functionally adjacent ones (i) and (j) of said elements, $(\theta_j)$ are threshold values for said elements, $(o_i)$ and $(o_j)$ are output values of said adjacent ones of said elements, and (T) is a variable for determining the size of said envelope.

7. A method for storing patterns in a neural network associated memory which memory comprises:
    a single layer of processing elements having source and destination ones of said elements which are respectively referenced to as (i) and (j) elements,
    each of said elements having available a summation means for summing weighted inputs to said elements and a transfer function means for computing transformation of said summed weighted inputs,
    an input means for and associated with individual ones of said elements for receiving patterns to be learned and patterns to be identified,
    an output means for and associated with individual ones of said elements for outputting patterns generated by said individual ones of said processing elements, a first set of unidirectional connections comprising a first set of variable value weights ($w_{ij}$) extending respectively from said output means of each of said elements (i) to said summation means of other ones of said elements (j), and a second set of unidirectional connections ($w_{jj}$) forming variable value self weights extending respectively from said output means of said elements (j) to said summation means of the same ones of said elements (j), said method comprising the steps of:

(a) applying a pattern to be learned to said input means, (b) iteratively calculating changes of said weights for said first and second sets of connections in accordance with the rule $\Delta w_{ij} = \eta p_i \delta j$ and $\Delta w_{jj} = \eta p_j \delta_j$ wherein ($\eta$) is a constant that determines the learning rate, ($p_i$) and ($p_j$) are predetermined values of said patterns being learned and identified and ($\delta_j$) are error terms, and (c) continuing step (b) until said weights are stabilized, and then storing said patterns.

8. A method according to claim 7 wherein each of said elements (j) has a threshold ($\theta_j$) and each of said output means ($o_j$) of a said element (j) has a sigmoid function $$o_j = 1 / \left( 1 + \exp\left[ -\sum_i o_i w_{ij} + \theta_j \right] \right);$$

said step (b) being further characterized by said ($\delta_j$) being equal to $(p_j - o_j) o'_j$ where ($p_j$) are values of said patterns to be learned, ($o_j$) are respective actual output values of said units (j), and ($o'_j$) is the derivative of said ($o_j$) with respect to the quantity $$\sum_i o_i w_{ij} - \theta_j$$

with said derivative being equal to $o_j(1-o_j)$.

9. A processing element assembly for use in a neural network having a plurality of such assemblies and wherein each two processing elements of functionally adjacent source and destination ones of said assemblies may be considered a pair and are referenced, respectively, as processing elements (i) and (j) of such pair, said assembly comprising, a processing element (j) having available a summation section for summing the values of weighted inputs and a transfer section for computing a transfer function for said summed weighted inputs, fan-in connection means for said summation section comprising externally connectable lines connected to said summation section, output means for said transfer section having fan-out connection means with multiple output lines for connection from said transfer section, a plurality of adjustable weight means associated respectively with said fan-in connection lines, a weight adjusting learning algorithm means for adjusting said weight means having associated memory means for storage of patterns, pattern input means for inputting a pattern to said memory means, circuit means so constructed and assembled for providing an initializing mode such that (1) a pattern element ($p_j$) placed on said pattern input means is directed to said memory means and to said multiple lines of said fan-out connection means by such circuit means, and (2) pattern elements ($p_i$) from source ones of said processing elements (i) on said fan-in externally connectable lines are directed to said memory means and to said summation section via said means by said circuit means, and wherein, said circuit means is also so constructed and assembled for providing a learning mode wherein (1) an output ($o_j$) of said transfer section output means is directed by said circuit means to said memory means and to said multiple lines of said fan-out connection means and (2) outputs ($o_i$) from source ones of said processing elements (i) on said fan-in externally connectable lines are directed by said circuit means to said memory means and to said summation section via said weight means thereof, said learning rule comprising the form $\Delta w_{ij} = \eta p_i \delta_j$ wherein ($w_{ij}$) values are a representational weighting value of said adjustable weight means between functionally adjacent ones of said source and destination processing elements, ($\delta_j$) are calculated error signals equal to $(p_j - o_j) o'_j$, and $\eta$ is a constant that determines the learning rate.

10. A processing element assembly according to claim 9 wherein said fan-in connection lines include a fan-in feedback line, said output ($o_j$) in said learning mode being also directed to said feedback line, and said learning rule also comprising the form $\Delta w_{jj} = \eta \alpha p_j$ j wherein $w_{jj}$ represents the weighting value of said adjustable weight means in said fan-in feedback line.

11. A processing element assembly according to claim 9 or 10 wherein said fan-in connection lines include a biased threshold line, and said learning rule also comprising the form $\nu \theta_j = \eta \delta_j$ wherein $\theta_j$ represents the weighting value of said adjustable weight means in said biased threshold line.

* * * * *